United States Patent
Anderson

[15] 3,687,560
[45] Aug. 29, 1972

[54] PROJECTOR PLAYER
[72] Inventor: Ray C. Anderson, 3700 15th St., Rock Island, Ill. 61201
[22] Filed: March 12, 1969
[21] Appl. No.: 806,619

[52] U.S. Cl. ..................352/8, 242/181, 242/192, 242/197, 242/209, 352/72, 352/123, 352/157
[51] Int. Cl. ....G03b 31/02, G03b 21/04, G03b 23/02
[58] Field of Search......242/180, 181, 197, 198, 201, 242/206, 207, 208, 209, 210, 71.1, 71.2, 67.4, 192; 352/6, 7, 8, 9, 10, 123, 133, 157, 158, 36, 74, 73, 72, 78

[56] References Cited

UNITED STATES PATENTS

| | | |
|---|---|---|
| 3,170,651 | 2/1965 | Galke et al. ...............242/181 |
| 3,197,150 | 7/1965 | Camras......................242/181 |
| 3,149,797 | 9/1964 | Pastor et al................242/195 |
| 3,025,011 | 3/1962 | Camras......................242/195 |
| 3,155,002 | 11/1964 | Sorrentino...............352/36 X |
| 3,516,738 | 6/1970 | Wells........................352/158 |

Primary Examiner—George F. Mautz
Attorney—Frank R. Thienpont

[57] ABSTRACT

An automatic sound film projector system effective to play in sequence a plurality of encased sound films. The system includes an electrically operated film feed mechanism for advancing the film from one of a plurality of film casettes into a self-threading projector, a sequentially operated electric rewind mechanism, an electrically operated retaining mechanism for preventing the ejection of more than one film cassette at a time, and a film casette ejector mechanism for ejecting a film that has been played and rewound.

16 Claims, 8 Drawing Figures

Inventor
Ray E. Anderson
By Frank R. Thuenport
Atty.

Inventor:
Ray C. Anderson
By Frank R. Thompson
Atty

3,687,560

PROJECTOR PLAYER

BACKGROUND OF THE INVENTION

This invention relates to optics and motion pictures with sound accompaniment and particularly to apparatus having removable film strips of the magazine type with spool or magazine selection and ejection.

Self-threading projectors, including projectors with sound accompaniment are well known in the art.

SUMMARY OF THE INVENTION

It is an object of this invention to provide a sound film projector having a mechanism that is effective to pick up and advance automatically the film from a film casette into a self-threading projector.

It is another object to provide a rewind mechanism that is operable upon completion of the projection of the film to return the film automatically into its casette.

A still further object to provide a film casette ejector mechanism effective to eject, upon completion of the rewinding of the film, the film clip or casette that has been played.

It is an additional object to provide a film clip retaining mechanism that cooperates with the ejector mechanism to prevent the ejection of more than one film clip at a time.

BRIEF DESCRIPTION OF THE DRAWINGS

Like characters of reference designate like parts in the several views.

DESCRIPTION OF A PREFERRED EMBODIMENT

Figure 1:
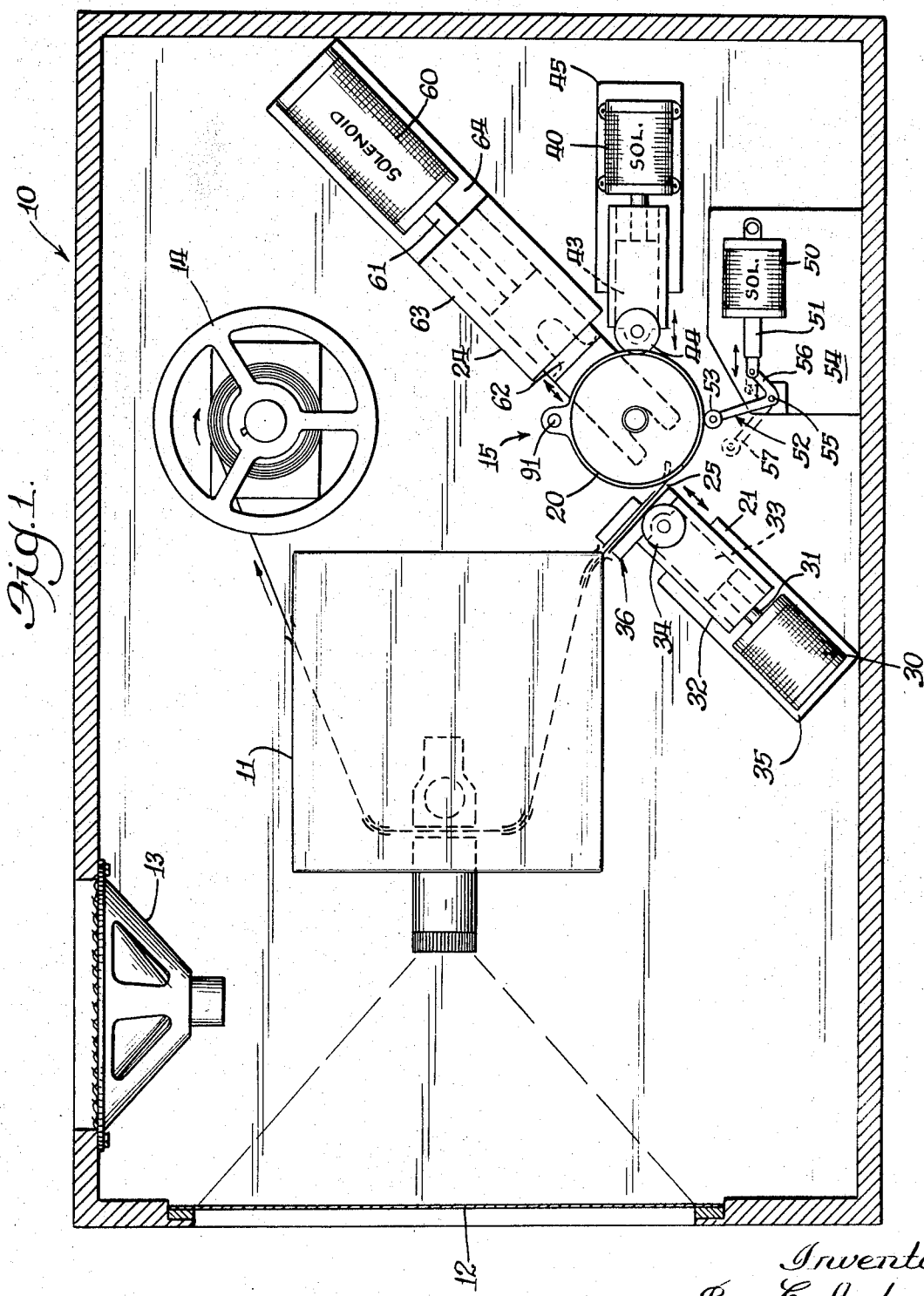
FIG. 1 is a top view showing the interior of a projector player embodying the present invention.

The projector player of the present invention is designated generally by the numeral 10 and comprises a self-threading projector 11, a rear projection screen 12, a speaker 13, a take-up reel 14, and a film selector and ejector mechanism 15 all contained within a case or housing 16.

The film selector and ejector mechanism 15 is designed to operate on a plurality of film clips or casettes or cartridges 20. The terms, film clip, casette, and cartridge, are used interchangeably and with similar meaning throughout the specification to denote the element 20. The mechanism 15 generally comprises a film advance mechanism 21, a film reversing mechanism 22, a film clip retaining mechanism 23, and a film clip ejector mechanism 24. A sound track film 25 is contained within the casette 20 and is fed through the projector 11 to the take-up reel 14.

The film advance mechanism 21 comprises a solenoid 30 having a longitudinally movable armature 31, a guide block 32, a right angle drive electric motor 33 carrying a drive wheel 34, and a mounting base 35. The armature 31 is connected to the motor 33 and is effective to move it longitudinally, when the solenoid 30 is energized, so that the drive wheel 34 contacts the film 25 and advances it into the projector 11. The guide block 32 is fixedly mounted on the base 35 and constrains the motor 33 to be moved in only one dimension. A film guide 36 comprising a pair of thin metal strips 37 and 38 are also mounted on the base 35. The strips 37 and 38 are flared outwardly at their upper ends for receiving the film of another casette 20A as it drops into the play position.

The film reversing mechanism 22 is similar to the film advance mechanism 21, and comprises a solenoid 40 having a longitudinally movable armature 41, a guide block 43, a right angle drive electric motor 43 carrying a drive wheel 44, and a mounting base 45. When the solenoid 40 is energized, the armature 41, connected to the motor 43, moves the drive wheel 44 into a drive position in contact with the film spool carrying the film 25 to return it into the casette 20. The direction of rotation of the drive wheel 44 is opposite from that of the drive wheel 34, as should be apparent.

The film clip retaining mechanism 23 comprises a solenoid 50 having a longitudinally movable armature 51, a bell crank 52 carrying a friction roller 53, and a mounting base 54. The bell crank 52 is pivoted on a pin 55 and is connected by one of its arms 56 to the armature 51. When the solenoid 50 is de-energized, the bell crank 52 is in the dotted-line position 57. When the solenoid 50 is energized, the armature 51 moves to the right and swings the bell crank 52 into the solid-line position shown where the roller 53 contacts a cassette 20A which lies on top of the casette 20. The roller 53 is effective to hold the casette 20A in the position shown until the solenoid 50 is de-energized.

The ejector mechanism 24 comprises a solenoid 60 having a longitudinally movable armature 61 connected to a fork 62, a guide block 63, and a mounting base 64. When the solenoid 60 is de-energized, the fork 62 is in its outermost position as shown by the dotted lines in FIG. 1 where it supports the casette 20 during the cycle while the film is being played and rewound. When the solenoid 60 is energized, the armature 61 and fork 62 are retracted into the guide block 63 so that the casette 20 falls out of the play position.

The film clip or casette 20 may comprise a generally cylindrical pan-shaped plastic or metal housing or case 70, a circular lid 71, and a film spool 72. The case 70 is formed with an integral, radially extending flame or handle 73 having a vertically extending aperture 74, a circumferentially extending aperture 75 in the wall of the case 70 through which the drive wheel 44 may extend, and a tangentially opening slot 76 through which the film 25 is advanced and retracted. The bottom of the case 70 is also formed with a centrally disposed circular opening 77, and the upper edge of the case 70 is formed with a stepped circular shoulder 78 for retaining the lid 71.

The lid 71 is formed with a central circular aperture 79 and a semi-lunar opening 80 at its edge. The opening 80 provides access to the interior for manually feeding the film 25 through the slot 76, if required.

The spool 72 has a large diameter disc 81 and a small diameter hub 82 on which the film 25 is wound. An axial central bore 83 is formed through the spool 72 and registers with the openings 77 and 79. The disc 81 is only slightly smaller than the interior diameter of the case 70 and the spool 72 is adapted to rotate within the case 70. The outer periphery 84 of the disc 81 is exposed through the aperture 75.

Figure 2:
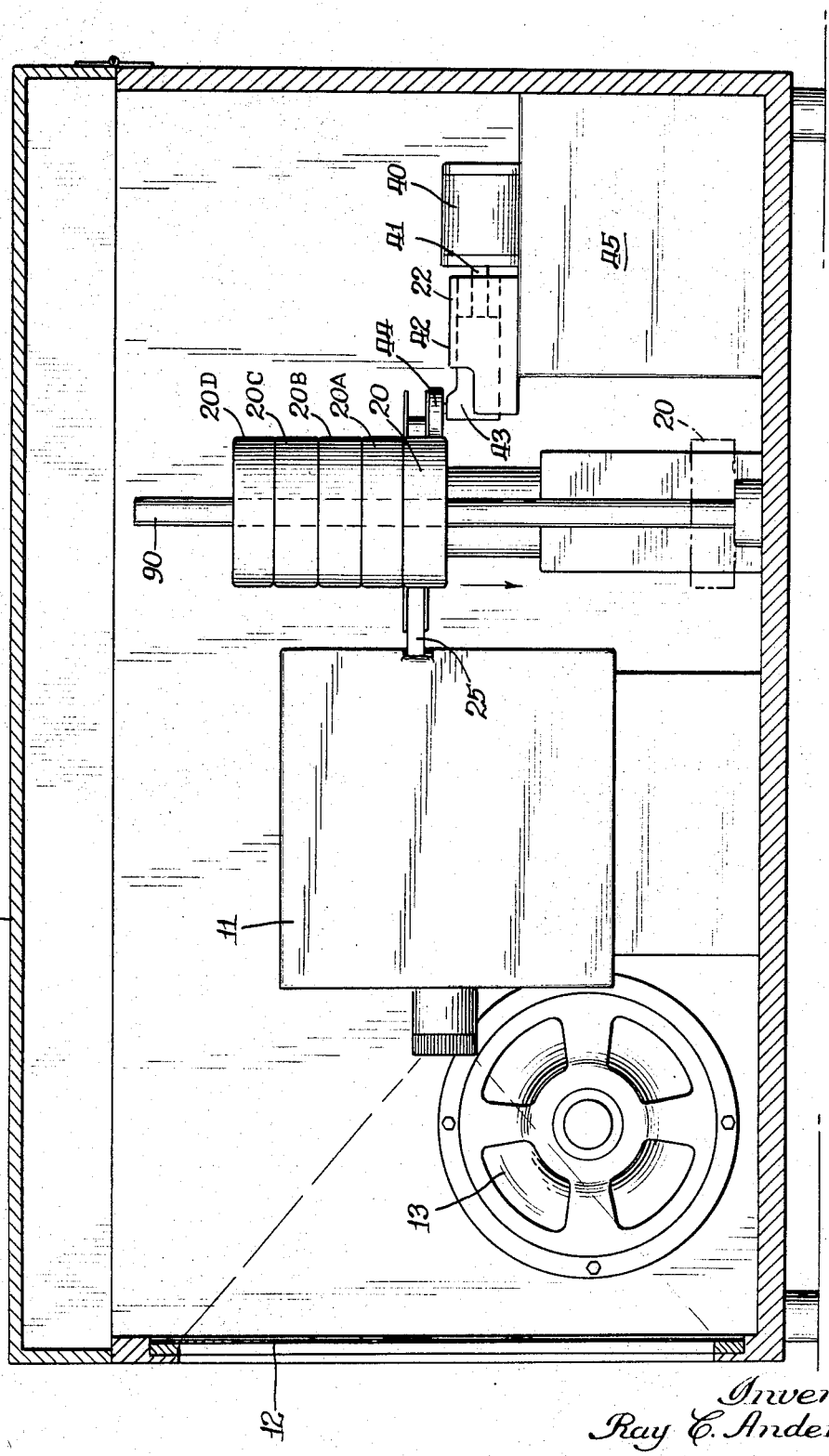
FIG. 2 is a side view of the interior of the projector player.

The film casette 20 is inserted into the player 10 by mounting in on a vertical guide rod or spindle 90 which extends through the bore 83. For multiple play use, a plurality of casettes 20A, 20B, 20C and 20D, for example, may be stacked on top of the casette 20. A second vertical rod 91 extends through the aperture 74 of each of the casettes 20–20D and prevents relative rotation of the casettes about the rod 90. The casettes are stacked in the position shownn in FIG. 2 with about an inch or two of film extending out of the slots 76 sufficient to be received by the flared strips 37 and 38 of the film guide 36.

Figure 3:
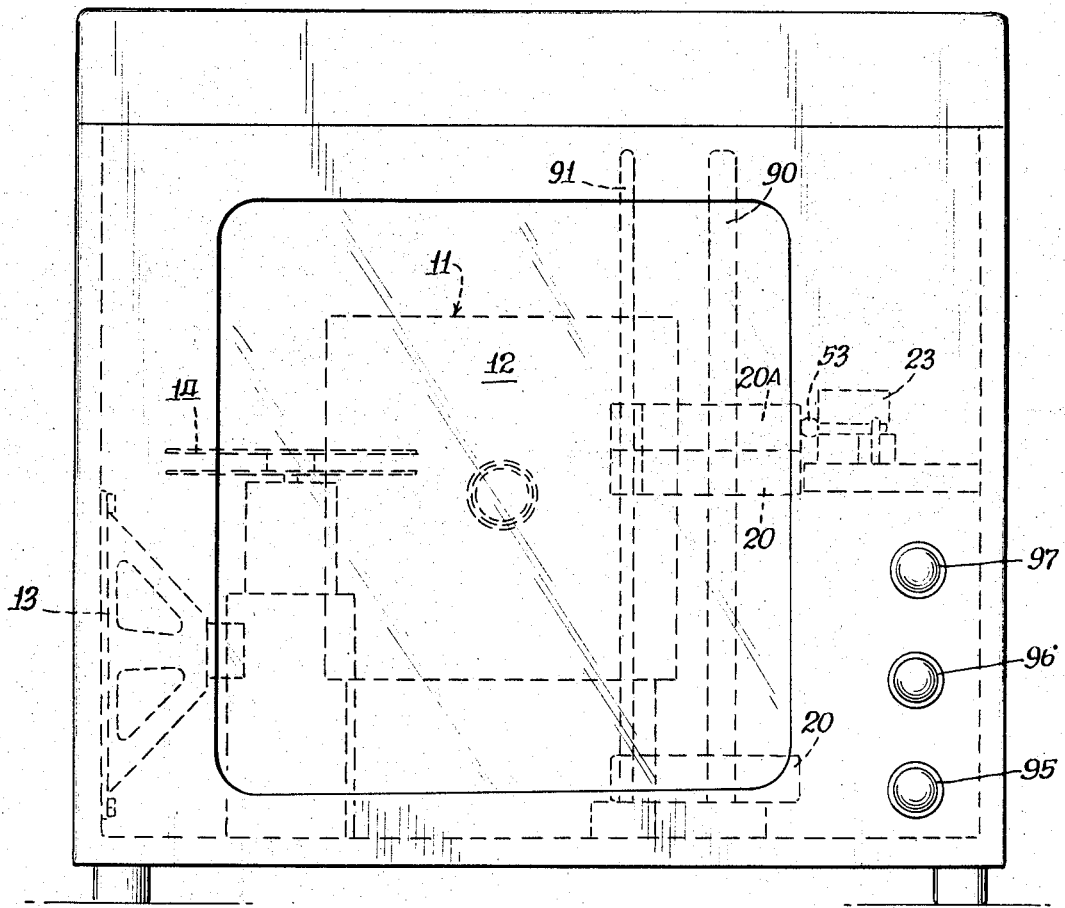
FIG. 3 is a front view of the player and showing a phantom view of the interior.
Figure 5:
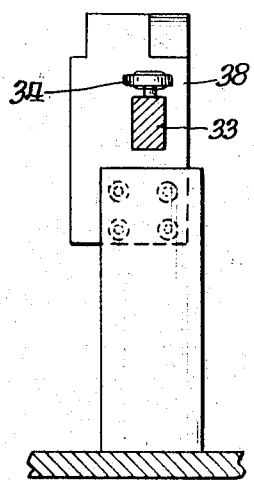
FIG. 5 is an end view taken on line 5—5 of FIG. 4.
Figure 4:
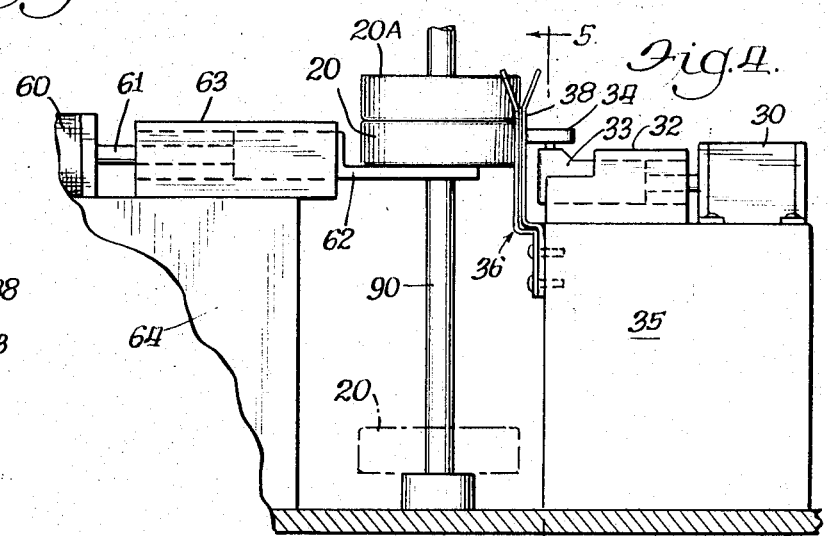
FIG. 4 is a fragmentary view of a portion of the film feed and drive mechanism.
Figure 6:
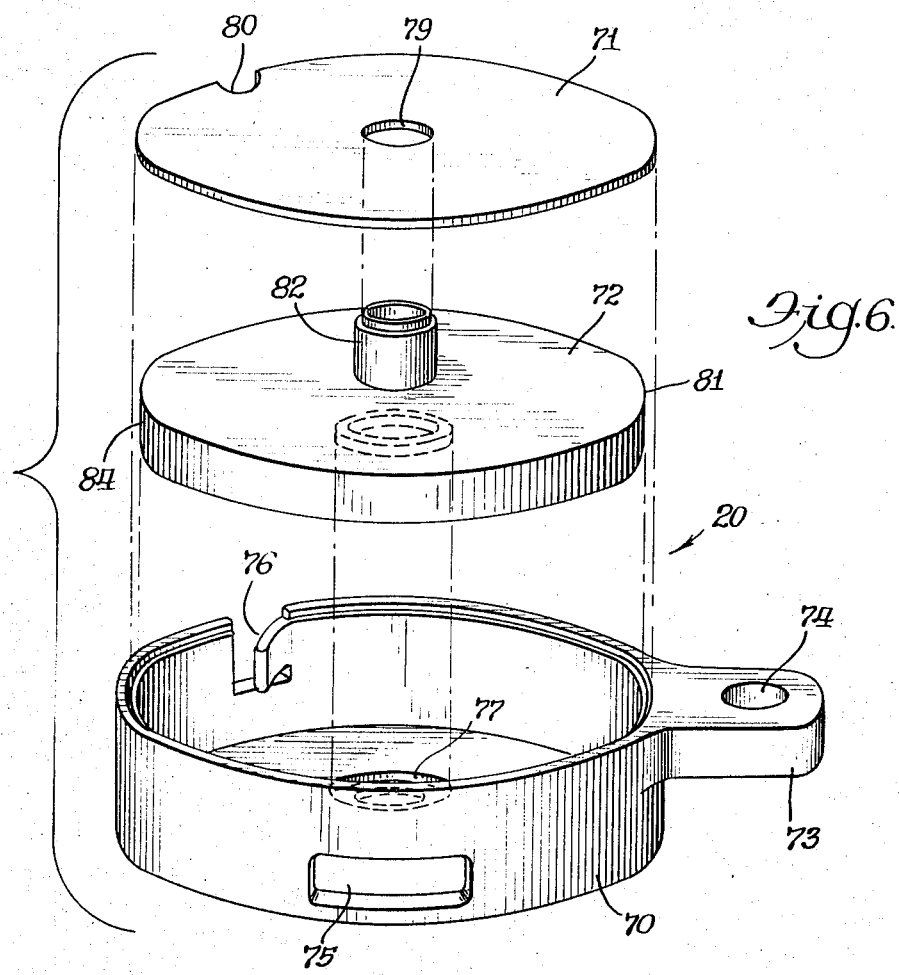
FIG. 6 is an exploded view of a film clip or casette.
Figure 7:
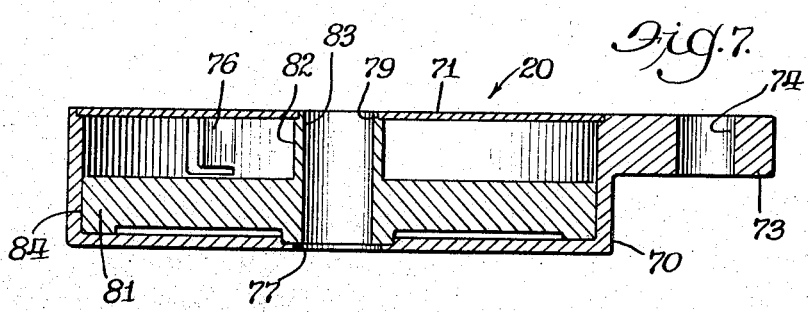
FIG. 7 is a cross-sectional view of the film clip.
Figure 8:
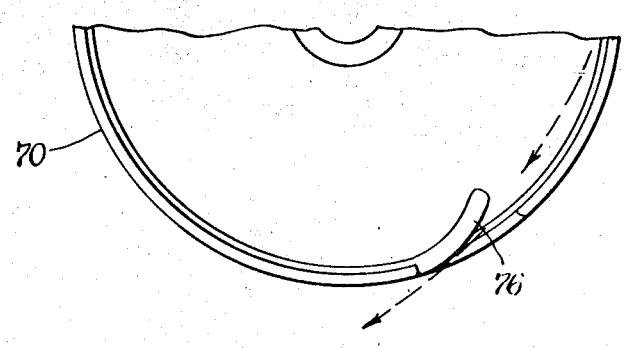
FIG. 8 is a fragmentary view of a portion of the film clip showing the slot through which the film escapes.

Referring to FIG. 3, control buttons 95, 96 and 97 are shown and are connected to suitable electrical switches and timers (not shown) for operating the player 10. The switch 95 is an "On-Off" control for switching on the power to the player 10. Switch 96 is a "Play" control for starting the cycle of operation. Switch 97 is a "Regular-Long Play" control for setting the time of the cycle according to the length of film in the casette 20. Appropriate timing mechanisms are provided in the apparatus to control the viewing time, rewind time, and ejection time.

In operation, the casettes 20–20D are inserted in the player 10 as described above with the casette 20 resting on the fork 62 of the ejector mechanism 24. Switching the control button 95 to "On" supplies power to the player 10. Switching the "Play" control button 96 on starts the cycle. The control 97 is previously set to correspond with the length of film being played.

The solenoid 30 and motor 33 are actuated to bring the drive wheel 34 into contact with the free end of the film 25. The wheel 34 forces the film 25 through the guide 36 into the projector 11. After the film is taken up by the projector 11, the motor 33 and drive wheel 34 continue to run for a minute period of time to insure takeover by the projector feed. Then the solenoid 30 and the motor 33 are de-energized by a timer (not shown). The film 25 is self-fed through the projector 11 and is picked up by the take-up reel 14. The film is projected on the screen 12 and the sound on the film track is played through the speaker 13. A timer (not shown) determines when the film is at an end.

At the end of the film, the take-up reel 14 stops, the lamp in the projector 11 goes out and the projector 11 reverses or disengages, and the speaker 13 cuts out. The rewind solenoid 40 and motor 43 are energized and the drive wheel 44 is moved through the aperture 75 into contact with the surface 84 of the disc 81. The motor 43 thus rewinds the film 25 into the casette 20 while the take-up reel 14 and its drive mechanism provide sufficient drag to ensure smooth even flow of the film 25 into the casette 20.

After the film 25 has been completely rewound into the casette 20, the solenoid 40 is de-energized permitting retraction of wheel 40. Then the solenoid 50 of the retaining mechanism 23 is actuated and the bell crank 52 brings the friction roller 53 into contact with the casette 20A. The solenoid 60 of the ejector mechanism 24 is energized next to withdraw the fork 62 from beneath the casette 20. The casette 20 is permitted to fall to the bottom of the rod 90 while the remaining casettes are held in place by the retaining mechanism 23. The solenoid 60 is then de-energized and the fork 62 returns to its original position. The solenoid 50 is then de-energized and the friction roller 53 removed permitting the stack of remaining casettes 20A–20D to fall into place with the casette 20A in the play position resting on the fork 62. The end of film projecting from the casette 20A is picked up by the film guide 36, the solenoid 30 and motor 33 are energized and the play cycle is repeated.

There has been shown and described an automatic projector player effective to project, rewind, and advance in sequence a plurality of encased sound films. It is to be understood that the embodiment shown and described is by way of example only, and the invention is not to be considered as limited thereto except insofar as the claims may be so limited.

I claim:

1. An automatic sequential film clip playing apparatus adapted to carry a plurality of film clips and adapted for use with a self-threading sound film projector comprising:

means for mounting a plurality of film clips each containing a reel of film to be projected;

film advance means including an electrically actuatable device adapted to advance the film from one of the film clips to the projector;

film rewind means including a second electrically actuatable device for rewinding the film into the film clip;

film clip ejection means including a third electrically actuatable device operable to permit release of the film clip;

film clip retaining means having a fourth electrically actuatable device associated therewith, said retaining means being adapted to retain one or more clips during the actuation of said third electrical device so as to prevent the release of more than one clip; and said fourth electrically actuatable device including a movable friction member and a normally de-energized electrically actuated solenoid connected to said friction member, said solenoid when energized being effective to move said friction member into contact with one of said film clips to prevent ejection of all film clips except the one to be ejected.

2. An automatic sequential film clip playing apparatus adapted to carry a plurality of film clips and adapted for use with a self-threading sound film projector comprising:

means for mounting a plurality of film clips each containing a reel of film to be projected;

film advance means including an electrically actuable device adapted to advance the film from one of the film clips to the projector;

film rewind means including a second electrically actuable device for rewinding the film into the film clip;

film clip ejection means including a third electrically actuatable device operable to permit release of the film clip; and wherein said film advance means includes a motor driven drive wheel and an electrically actuated solenoid connected to said motor and adapted when energized to advance said motor and the associated drive wheel into contact with the film.

3. An automatic sequential film clip playing apparatus adapted to carry a plurality of film clips and adapted for use with a self-threading sound film projector comprising:

means for mounting a plurality of film clips each containing a reel of film to be projected;

film advance means including an electrically actuatable device adapted to advance the film from one of the film clips to the projector;

film rewind means including a second electrically actuatable device for rewinding the film into the film clip;

film clip ejection means including a third electrically actuatable device operable to permit release of the film clip; and wherein said film rewind means includes a motor driven drive wheel and an electrically actuated solenoid connected to said motor and adapted when energized to move said motor and associated drive wheel into operative engagement with the film clip to rewind the film into the film clip.

4. An automatic sound film playing apparatus and ejector mechanism for use with a self-threading projector and comprising:

a film casette adapted to contain a reel of film to be projected;

a film advance mechanism including an electrically driven motor driving a drive wheel that is adapted to be brought into contact with the film from the casette for advancing it into the projector; and an electrically actuated solenoid connected to said motor and effective when energized to advance said motor and said drive wheel into contact with the film.

5. The apparatus of claim 4 including:

a film rewind mechanism comprising a second electrically driven motor driving a drive wheel that is adapted to rewind the film; and a second electrically actuated solenoid connected to said second motor and effective when energized to advance said motor and said drive wheel into a rewind position.

6. The apparatus of claim 4 including:

means for automatically de-energizing said solenoid for moving said drive wheel out of contact with the film as soon as the film is picked up by the projector.

7. The apparatus of claim 5 including:

a film casette supporting device for holding the casette in a play position; and an electrically actuated solenoid connected to said supporting device and effective when energized to remove said supporting device from the film casette so that the casette is ejected from the play position.

8. The apparatus of claim 7 including:

a plurality of film casettes stacked in a vertical array;

a friction contact member adapted to contact one of said casettes; and an electrically actuated solenoid connected to said member and effective when energized to hold said casettes and prevent the ejection of any casette other than the one to be ejected.

9. An automatic sound film casette projector apparatus comprising:

a housing having a plurality of side walls;

a self-threading sound film projector means disposed within said housing;

a projection screen disposed in one of said side walls of said housing;

a film casette adapted to contain a reel of film to be projected;

a film advance mechanism including an electrically driven motor driving a drive wheel that is adapted to be brought into contact with the film from the casette for advancing it into the projector, and an electrically actuated solenoid connected to said motor and effective when energized to advance said motor and said drive wheel into contact with the film.

10. The apparatus of claim 9 including:

a film rewind mechanism comprising a second electrically driven motor driving a drive wheel that is adapted to rewind the film; and a second electrically actuated solenoid connected to said second motor and effective when energized to advance said motor and said drive wheel into a rewind position.

11. The apparatus of claim 9 including: means for automatically de-energizing said solenoid for moving said drive wheel out of contact with the film as soon as the film is picked up by the projector.

12. The apparatus of claim 10 including:

a film casette supporting device for holding the casette in a play position; and an electrically actuated solenoid connected to said supporting device and effective when energized to remove said supporting device from the film casette to that the casette is ejected from the play position.

13. The apparatus of claim 12 including:

a plurality of film casettes stacked in a vertical array;

a friction contact member adapted to contact one of said casettes; and an electrically actuated solenoid connected to said member and effective when energized to hold said casettes and prevent the ejection of any casette other than the one to be ejected.

14. An automatic sound film casette projector apparatus comprising:

a housing having a plurality of side walls;

a self-threading sound film projector means disposed within said housing;

a projection screen disposed in one of said side walls of said housing;

means for supporting a film casette adapted to contain a reel of film to be projected;

a film advance mechanism including an electrically driven motor driving a drive wheel that is adapted to be brought into contact with the film from the casette for advancing it into the projector, and an electrically actuated solenoid connected to said motor and effective when energized to advance said motor and said drive wheel into contact with the film.

15. The apparatus of claim 14 including:
- a film rewind mechanism comprising a second electrically driven motor driving a drive wheel that is adapted to rewind the film; and
- a second electrically actuated solenoid connected to said second motor and effective when energized to advance said motor and said drive wheel into a rewind position.

16. The apparatus of claim 14 including:
- means for automatically de-energizing said solenoid for moving said drive wheel out of contact with the film as soon as the film is picked up by the projector.

* * * * *